No. 641,195. Patented Jan. 9, 1900.
J. W. CULMER & G. B. HOYT.
SPRING BALANCE COMPUTING SCALE.
(Application filed Feb. 4, 1898.)

(No Model.) 2 Sheets—Sheet 1.

Witnesses
E. B. Gilchrist
Philip E. Knowlton

Inventors
John W. Culmer,
George B. Hoyt,
By their Attorneys
Thurston & Bates

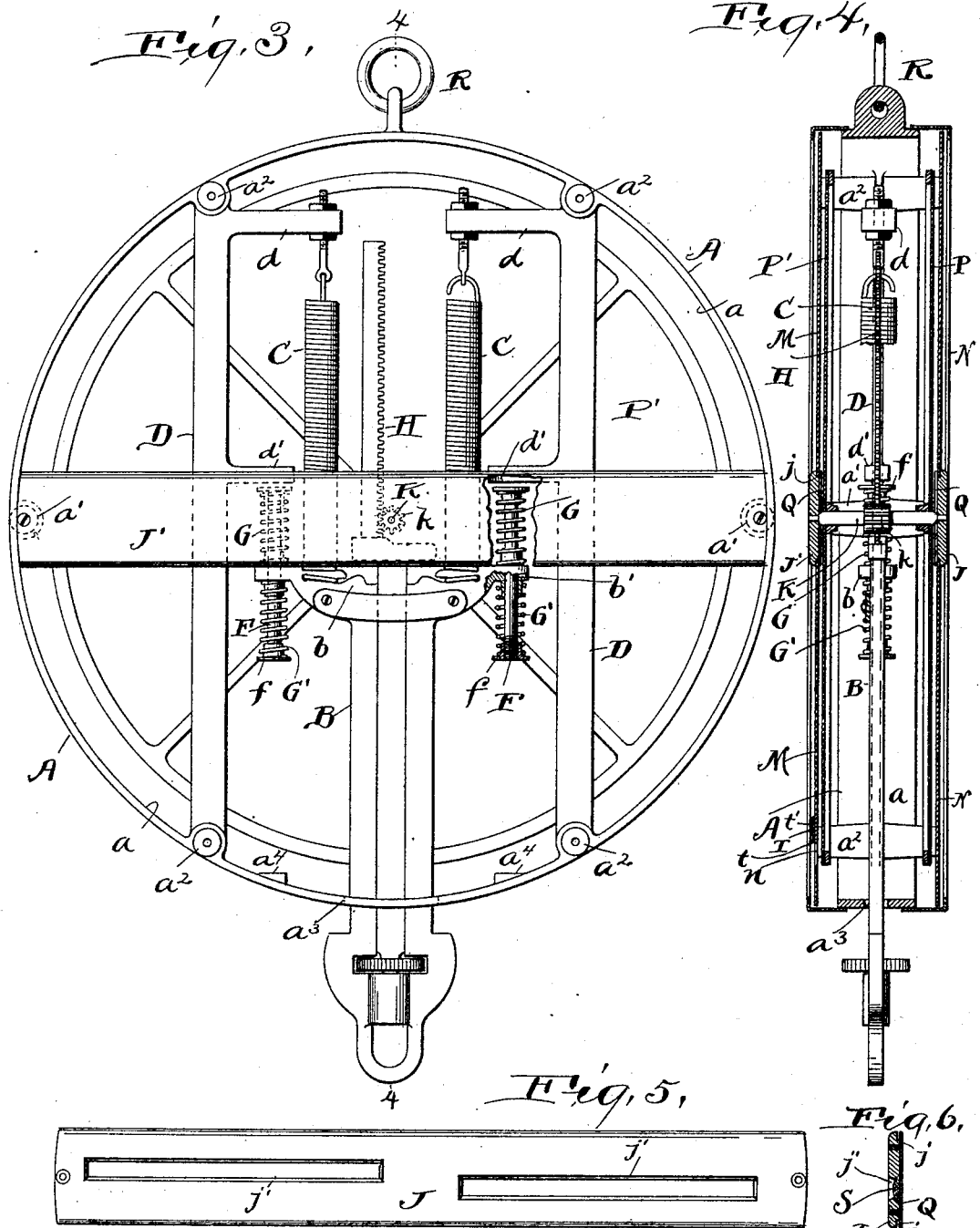

UNITED STATES PATENT OFFICE.

JOHN W. CULMER AND GEORGE B. HOYT, OF CLEVELAND, OHIO, ASSIGNORS TO THE NATIONAL COMPUTING SCALE COMPANY, OF SAME PLACE.

SPRING-BALANCE COMPUTING-SCALE.

SPECIFICATION forming part of Letters Patent No. 641,195, dated January 9, 1900.

Application filed February 4, 1898. Serial No. 669,077. (No model.)

*To all whom it may concern:*

Be it known that we, JOHN W. CULMER and GEORGE B. HOYT, citizens of the United States, residing at Cleveland, in the county of Cuyahoga and State of Ohio, have invented a certain new and useful Improvement in Spring-Balance Computing-Scales, of which the following is a full, clear, and exact description, reference being had to the accompanying drawings.

Our invention relates to spring-balance computing-scales, and especially to certain features of construction whereby such scales may be assembled and fitted with greater ease and accuracy and operated with less danger of derangement from shock; also, to the employment in such a scale of two dials so graduated that one shall express to the operator the money value of the article being weighed, while the other shall express to the purchaser the weight of such article, in combination with face-plates covering said dials and having suitable openings through which the indications of weight and value may be read; also, in such other improvements as are herein shown and described, and particularly pointed out in the claims.

Figure 1:
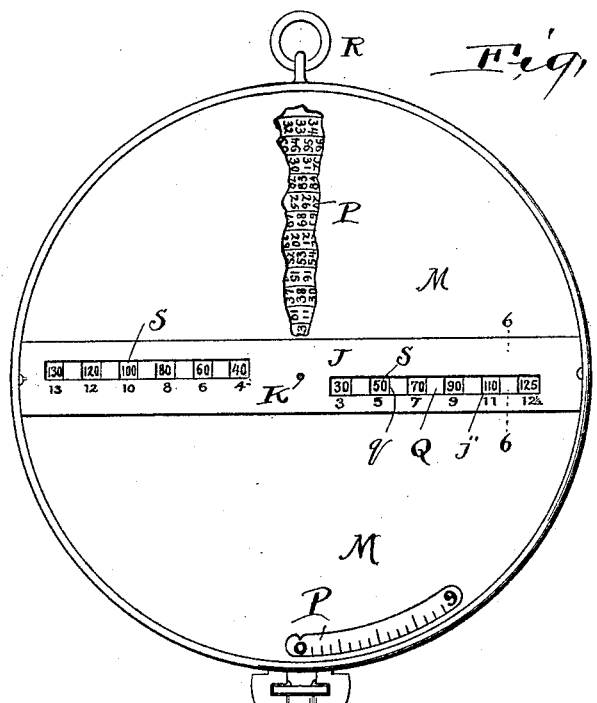
Figure 2:
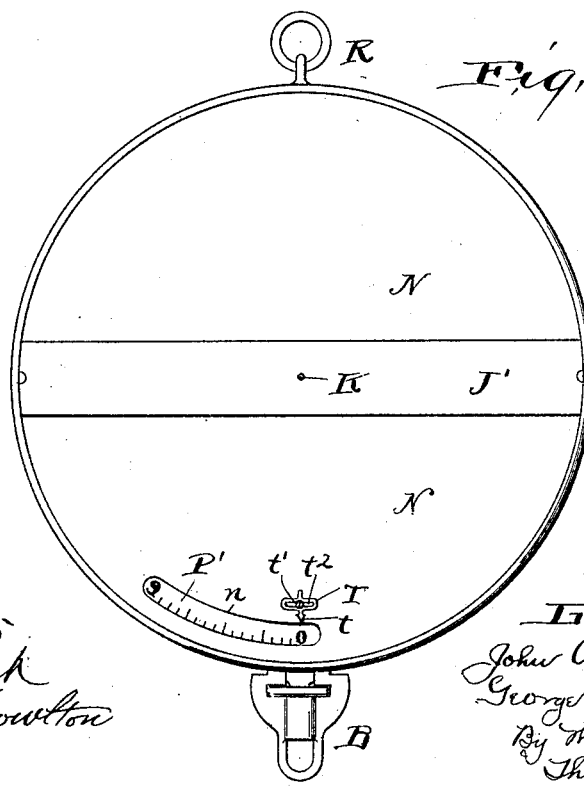

In the drawings, Figure 1 is an elevation of that face of the scale which indicates values. Fig. 2 is an elevation of that face of the scale which indicates weights. Fig. 3 is an elevation of a scale embodying our invention with one face-plate or cover removed to show the construction of the interior mechanism. Fig. 4 is a transverse vertical sectional view on line 4 4 of Fig. 3. Fig. 5 is a front elevation of the bridge-bar on the value-indicating face of the scale, and Fig. 6 is a transverse sectional view of the same on line 6 6 of Fig. 1.

Referring to the parts by letters, A represents the scale-frame, which is in the form of a ring having projecting bosses $a'$ $a^2$ for fastening the bridge-bars and face-plate to the frame. This frame A is suspended by a loop R, secured to its upper edge. At a point diametrically opposite to this loop a hole $a^3$ is formed through the scale-frame to permit the runner to pass through it. On opposite sides of the center of the scale are two approximately vertical bars D, which may be integral with or securely fastened to the frame. Near their upper ends these bars are provided with the bracket-arms $d$, which project toward the center of the scale, these arms being provided for the attachment of the upper ends of the springs C upon which the runner is suspended. The runner may be constructed in the ordinary way, except that its cross-head $b$ is provided at its extremities with vertical holes $b'$. A rod F, threaded at both ends, passes freely through each opening. Upon each end of each rod is a screw-nut $f$, and between said nuts and the cross-head and surrounding the rod F are spiral springs G G', which springs are balanced against each other by means of the nuts.

Upon the vertical bars D are the stop-arms $d'$, which lie above the cross-head $b$ and in such position that the upper ends of the rods F may strike them. Upon the inner surface of the ring $a$ are the anvils $a^4$, against which the lower ends of said rods F may strike. The length of the rod F and the tension applied to the springs G are such that when the scale is in its normal condition—that is to say, when it is not loaded—there is a slight space between the upper end of each rod F and the corresponding stop-arms $d'$, and when the scale is loaded to its full capacity there is a small space between the lower ends of the rods F and the corresponding anvils or stops $a^4$. When, however, the scale is suddenly unloaded and the runner is drawn upward past its normal position of rest by the action of the scale-springs C, the upper ends of the rods F strike the stop-arms $d'$, and the movement of the runner is yieldingly stopped by the action of the springs G. In like manner the movement of the runner below the position in which they come to rest when the scale is fully loaded, due to the sudden loading of the scale, causes the lower ends of these rods F to strike against the anvils $a^4$, and the runner is yieldingly stopped by the springs G'. These springs therefore act to prevent any injurious shocks to the scale mechanism due to the sudden loading or unloading of the scale.

The runner B carries a rack H, secured to it in the usual manner, and this rack engages with a pinion $k$ on the spindle K. This spindle occupies a horizontal position at the center of the scale, and it is mounted at its end in bearings in two bridge-bars J J'. These bridge-bars are horizontal and are secured at their ends to the bosses $a'$ by screws, one of these bridge-bars forming part of one scale-face and the other forming part of the other scale-face. In the upper and lower edges of each of these bars are the grooves $j$. The straight edges of the approximately semicircular face-plates M and N enter these grooves, while said face-plates are fastened to the bosses $a^2$ by screws. The back walls of these grooves in the bridge-bar may be formed by thin plates of metal Q, which are screwed to the rear sides of said bridge-bars.

Near one extremity of the spindle K and behind the corresponding face-plate M is a dial P and near the other end of said spindle a dial P', both being connected with the spindle in a suitable manner, so as to be compelled to revolve with it. The dial P is graduated in the usual way with concentric rows of value graduations at different rates per unit of value. The outer face of the other dial P' has one row of graduations, indicating weights. The weights may be seen by the observer through an arc-shaped opening $n$ in one of the face-plate sections N. The value graduations may be seen through two horizontal slots or sight-openings $j'$ in the bridge-bar J on opposite sides of the scale-center. Over these sight-openings the magnifying-glasses S are secured. They are set in recesses in the back face of the bar J, wherein they are held by the same plates Q heretofore referred to. These plates Q, in line with the sight-openings, are provided with a series of holes $q$, located so as to be over the respective annular rows of value graduations on the dial. The rates per unit are marked in figures upon the outer face of the bridge-bar in line with these smaller openings in the plate Q. On the other face-plate, adjacent to the sight-opening therein, is secured an adjustable pointer $t$. In securing the dials to the spindle it is intended that when the scale is at rest both dials shall indicate zero. It may be, however, that said dials shall not be secured to the spindle in the exact relation to each other which they should be, in which case it is desirable to have means by which both dials may be caused to indicate zero when the scale is at rest. The means provided consist of a plate T, carrying a pointer $t$, which plate is secured to the face-plate N, adjacent to the sight-opening therein, by means of a screw $t'$ passing through a slot $t^2$ in said plate and screwing into the face-plate.

It will be seen that the described construction of the face-plates admits of accurate centering of the dial and fitting of the spindle K, and it further admits of the adjusting of the scale mechanism where one or more of the face-plate sections are removed, so that the adjuster may observe the operation of the interior of the mechanism and correct any defects therein while the spindle is in its permanent bearings. After this the face-plate sections may be secured without danger that the correct operation of the parts will be affected thereby.

The dial P, which is graduated to indicate values, has near its outer periphery an annular row of weight-indicating graduations, which graduations are visible through an arc-shaped sight-opening $m$ in one of the semicircular plates.

Having described our invention, we claim—

1. In a spring-balance scale, the combination of a spring-suspended runner having lateral arms, and the scale-frame having stops above and below said runner-arms, with buffer-springs between said arms and stops and adapted to yieldingly stop the movement of the runner after it has passed the positions it would occupy when the scale is empty or when loaded to its capacity, substantially as specified.

2. In a spring-balance scale, the combination of a spring-suspended runner, the scale-frame, and stops therein, with buffer-springs carried by the runner and adapted to engage with said stops when the runner is carried up beyond its normal position when the scale is empty, or down below the position it occupies when the scale is loaded to its capacity, whereby said runner is yieldingly stopped, substantially as specified.

3. In a spring-balance scale, a spring-suspended runner having oppositely-extended lateral arms through each of which a vertical hole is formed, a rod passing freely through each of said holes, nuts which screw onto the opposite ends of said rods, and springs above and below said arms, surrounding said rods, and retained and adjusted by said nuts, in combination with the scale-frame having stops above and below said arms and adapted to be engaged by said rods, substantially as and for the purpose specified.

4. In a spring-balance scale, a rotatable spindle and its operating mechanism, with a dial on said spindle and having an annular row of weight-indicating graduations, a face-plate secured over said dial and having an arc-shaped sight-opening and a plate, carrying a pointer, and having a slot, and a screw passing through said slot and taking into the face-plate, whereby the reading-point on said dial may be adjusted or corrected, substantially as specified.

5. In a spring-balance scale, the combination of the scale-frame, the scale mechanism which includes a spindle, a graduated dial on said spindle, and a face-plate covering said dial, which face-plate is composed of a bridge-bar which is fastened to the scale-frame and furnishes the bearing for one end of the spindle, and two approximately semicircular plates secured to the scale-frame, said face-plates having a sight-opening, substantially as and for the purpose specified.

6. In a spring-balance scale, the combination of the scale-frame, a horizontal bridge-bar secured to said frame and furnishing a bearing for one end of the scale-spindle, said bar having grooves in its upper and lower edges, and two approximately semicircular plates whose straight edges fit in said grooves, said plates being fastened to the scale-frame, substantially as and for the purpose specified.

7. In a spring-balance scale, the combination of the scale-frame, the scale-spindle, its operating mechanism, and two dials made fast to said spindle near opposite ends thereof, which dials face in opposite directions, with two horizontal bridge-bars secured to the scale-frame and having bearings for the scale-spindle, and approximately semicircular plates secured to the scale-frame and forming with said bridge-bars the face-plates which cover said dials, said face-plates having sight-openings through which the graduations upon the dials may be read, substantially as specified.

In testimony whereof we hereunto affix our signatures in the presence of two witnesses.

JOHN W. CULMER.
GEORGE B. HOYT.

Witnesses:
LUELLA BARK,
PHILIP E. KNOWLTON.